Patented July 3, 1934

1,965,463

UNITED STATES PATENT OFFICE 1,965,463

RUBBER COMPOSITION AND METHOD OF MAKING THE SAME

Webster N. Jones, Akron, Ohio, assignor to The B. F. Goodrich Company, New York, N. Y., a corporation of New York No Drawing. Application March 19, 1931, Serial No. 523,945

30 Claims. (Cl. 18—50)

This invention relates to a method of producing a rubber composition having high resistance to deterioration under the influence of heat, light and exposure to air, and to a rubber composition made by such process. It has long been recognized that vulcanized rubber goods, such as tires, garden hose and other articles, when exposed to light, heat, and air, deteriorate with greater or less rapidity. As a consequence, attempts have been made to treat rubber compositions with substances which extend the useful life of manufactured rubber articles. To this end, it has been proposed to apply to the surface of manufactured rubber articles preservative compositions and also to introduce into the rubber mix before vulcanization materials generally classified under the term "antioxidant". A purpose of the present invention is to provide an antioxidant which shall be more effective in retarding the deteriorating influences hereinabove referred to and which shall be economical to manufacture and which can be used in relatively small proportions in the rubber mix.

I have found that the condensation products of polyhalogenated organic substances with amines are particularly effective in retarding deterioration of rubber compositions in which they are incorporated. Although it is to be understood that these condensation products may be used to prevent the deterioration and hardening of crude rubber in storage, they find their greatest usefulness when applied to articles already vulcanized to increase the normal period of their usefulness.

The preferred substances of this invention are such as may be prepared in general by reacting aromatic amines with halogenated aliphatic compounds, and particularly with polyhalogenated aliphatic hydrocarbons having not more than one halogen atom on each carbon atom. For example, such typical amines as aniline, toluidine, xylidine, aminobiphenyl, naphthylamine, diamino diphenyl methane, p-amino-diphenylamine, diamino diphenylamine, diamino diphenylether, benzidine, naphthylene diamine, aminophenol, p-amino dimethyl aniline, anisidine, phenetidine, p-chloraniline, etc., may be condensed with ethylene dichloride, ethylene dibromide, 1.2 propylene dichloride, trimethylene dichloride, tetramethylene dichloride, 1.2 dichlorethylene, 2, 2' dichlor-diethylether, 2, 2' dichlor-diethylsulphide, 1, 2 dichlor-diethylether, etc., preferably in the presence of a basic substance which will neutralize the halogen acids which are formed during the reaction. It is also preferred in many cases to carry out the reaction in the presence of a small proportion of water so that when the mixture is heated the steam formed will blanket the reaction mixture, preventing access of air which would oxidize and color the mass to an undesirable extent.

The products formed are in general secondary aromatic amines containing two amino groups. Although by-products having a different chemical constitution will be formed in varying proportions, depending on the conditions of the reaction, they are not ordinarily found in such proportions as to effect detrimentally the age-resisting properties of the product, and in certain cases may even have some age-resisting or anti-oxidant power of their own. The proportion of by-products formed is usually reduced to a minimum when an excess of the amine is employed as the base to neutralize the halogen acid formed.

As a typical example of the preparation of the improved anti-oxidants of this invention, 215 parts by weight of para-toluidine are placed together with about 20 parts of water in a kettle equipped with a reflux condenser and an agitator, and heated to about 375° F. The contents are stirred while 50 parts of ethylene dichloride are added, and the heating is continued for about an hour after the refluxing of the ethylene chloride has ceased. The reaction take place chiefly according to the following equation:

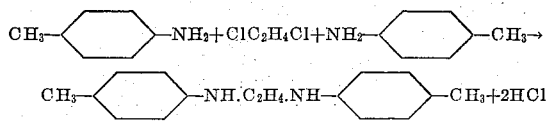

the hydrochloric acid uniting with the excess toluidine to form toluidine hydrochloride. The mixture is allowed to cool somewhat, and 160 parts of water in which are dissolved 45 parts of caustic soda are added to neutralize the toluidine hydrochloride. The aqueous liquid is withdrawn and the free toluidine separated by steam distillation. The residue is solidified by stirring in an open vessel, ground, washed, and dried ready for use in a rubber composition. It consists essentially of di p-tolyl ethylene diamine of a light tan color, which may be further purified by washing out some of the colored impurities with gasoline.

The reaction of the other substances mentioned above proceeds in a similar manner, although the proportions of the ingredients and the conditions of the reaction are subject to individual variations depending on the specific properties of the reacting materials and of the products. The 1,2 dichlorethylether, however, is decomposed during the reaction with an aromatic amine, liberating a molecule of alcohol and forming 1 phenylamino 2 phenylimino ethane instead of the diphenyl ethylene diamine (or diphenyl diamino ethane) formed from ethylene dichloride.

When incorporated into rubber compositions before vulcanization, preferably in the proportions of from ¼ to 5% of the rubber content of the composition, the anti-oxidants of this invention are extremely effective in retarding their deterioration, compositions so treated being capable of withstanding the deleterious effect of exposure to oxidizing materials or to the elements for a far longer period than similar untreated compositions. The anti-oxidants may likewise be applied to the surface of vulcanized or unvulcanized rubber with good effect on its resistance to deterioration, for example in the form of a powder, paste, or solution.

As a specific example of one embodiment of the method of this invention, a typical tire tread composition was prepared containing blended plantation rubbers approximately 100 parts by weight, sulphur 5.5 parts, zinc oxide 30 parts, gas black 40 parts, mineral rubber 10 parts, palm oil 5 parts, and hexamethylene tetramine 0.75 parts. The composition was divided into portions, into each of which was mixed a further 0.95 parts (0.5% of the weight of the composition) of one of the above-described class of anti-oxidants. The compositions were thoroughly mixed, and vulcanized in a press for 45 minutes at 145° C. (294° F.) to produce an optimum cure.

The relative rates of aging of the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per square inch. The substances tested in the various compositions were as follows:

A. Diphenyl ethylene diamine
B. Di p-tolyl ethylene diamine
C. Dixylyl ethylene diamine
D. Di-alpha-naphthyl ethylene diamine
E. Crude diphenyl diamino diethyl ether
F. Crude diphenyl diamino diethyl sulphide
G. Crude di-alpha-naphthyl diamino diethyl sulphide
H. 1 phenylamino 2 phenylimino ethane
I. 1 alpha-naphthylamino 2 alpha-naphthylimino ethane.

The results obtained are given in the following table in which T indicates ultimate tensile strength in pounds per square inch and E indicates ultimate elongation in per cent. of original length.

*Aging tests*

| Anti-oxidant | Before aging | | After 7 days in the Geer oven | | After 48 hours in the Bierer-Davis bomb | |
|---|---|---|---|---|---|---|
| | T | E | T | E | T | E |
| A | 3626 | 667 | 2536 | 512 | 1675 | 490 |
| B | 3635 | 653 | 2589 | 555 | 2087 | 537 |
| C | 3180 | 672 | 2033 | 557 | 1404 | 478 |
| D | 3434 | 667 | 2375 | 548 | 1930 | 545 |
| E | 3670 | 650 | 2320 | 517 | 1770 | 493 |
| F | 3832 | 670 | 2565 | 507 | 2076 | 537 |
| G | 3729 | 673 | 2591 | 507 | 1868 | 523 |
| H | 3570 | 630 | 2351 | 418 | | |
| I | 3723 | 680 | 2397 | 553 | | |

The same rubber composition when vulcanized and tested under the same conditions without the anti-oxidants deteriorated from an original tensile strength of about 3600 pounds per square inch and ultimate elongation of 640% to only 1830 pounds and 435% after 7 days in the Geer oven, and 760 pounds and 335% after 48 hours in the Bierer-Davis bomb.

It is evident from the above examples that rubber compositions containing even small proportions of the anti-oxidants of this invention resist deterioration far more effectively than similar untreated compositions.

The reason for the effectiveness of the secondary aromatic amines described above is not well understood. Other similarly constituted substances containing a single amino group such as ethyl-aniline have no appreciable effect on the aging of rubber. It appears, therefore, that the presence of at least two aromatic amino groups in the molecules of the compounds is essential to the present invention.

Obviously, the practice of this invention is not limited to the specific compositions given above, such compositions being merely illustrative of one manner of employing the anti-oxidants of this invention. The anti-oxidants may be employed in conjunction with other known anti-oxidants, or with other vulcanizing agents or accelerators than those here specifically disclosed. The proportions of the constituents may be varied, or other substances may be substituted generally therefor, since this invention is applicable to pure rubber or rubber compositions of the most varied nature.

It is to be understood that the term "treating" as employed in the appended claims is used in a generic sense to include either the incorporation of the anti-oxidants into the rubber by milling or similar process, or their addition to the rubber latex before the coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents.

This application is a continuation in part of my co-pending application, Serial No. 213,223, filed August 15, 1927.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with the reaction product of a primary aromatic amine and a halogen derivative of an aliphatic ether containing two halogens on different carbon atoms.

2. The method of preserving rubber which comprises treating rubber with a di(arylamino) derivative of an aliphatic ether in which the amino groups are attached to different carbon atoms.

3. The method of preserving rubber which comprises treating rubber with a diaryl diamino dialkyl ether.

4. The method of preserving rubber which comprises vulcanizing rubber in the presence of the reaction product of a primary aromatic amine and a halogen derivative of an aliphatic ether containing two halogens on different carbon atoms.

5. A rubber composition comprising rubber and the reaction product of a primary aromatic amine and a halogen derivative of an aliphatic ether containing two halogens on different carbon atoms.

6. A rubber composition comprising rubber and a di(arylamino) derivative of an aliphatic ether in which the amino groups are attached to different carbon atoms.

7. A rubber composition comprising rubber and a diaryl diamino dialkyl ether.

8. A rubber composition which has been vulcanized in the presence of the reaction product of a primary aromatic amine and a halogen derivative of an aliphatic ether containing two halogens on different carbon atoms.

9. A rubber composition including a BB' diamino diethyl ether wherein one of the hydrogen atoms of each amino group is replaced by an aryl hydrocarbon residue.

10. A rubber composition including the product obtained by heating one mol of BB' dichlor diethyl ether with at least two mols of aniline.

11. The method of preserving rubber which comprises treating rubber with the reaction product of a primary aromatic amine and a dichlor diethyl oxide.

12. The method of preserving rubber which comprises treating rubber with the reaction product of a primary aromatic amine and 2, 2' dichlor diethyl oxide.

13. The method of preserving rubber which comprises treating rubber with a diaryl diamino diethyl ether.

14. The method of preserving rubber which comprises treating rubber with diphenyl diamino diethyl oxide.

15. The method of preserving rubber which comprises treating rubber with the reaction product of a primary aromatic amine and 1, 2 dichlorethylether.

16. The method of preserving rubber which comprises treating rubber with the reaction product of a naphthylamine and a halogen derivative of an aliphatic ether containing two halogens on different carbon atoms.

17. The method of preserving rubber which comprises treating rubber with 1-alpha-naphthylamino 2-alpha-naphthylimino ethane.

18. A rubber composition comprising rubber and the reaction product of a primary aromatic amine and a dichlor diethyl oxide.

19. A rubber composition comprising rubber and the reaction product of a primary aromatic amine and 2, 2' dichlor diethyl oxide.

20. A rubber composition comprising rubber and a diaryl diamino diethyl ether.

21. A rubber composition comprising rubber and diphenyl diamino diethyl oxide.

22. A rubber composition comprising rubber and the reaction product of a primary aromatic amine and 1, 2 dichlorethylether.

23. A rubber composition comprising rubber and the reaction product of a naphthylamine and a halogen derivative of an aliphatic ether containing two halogens on different carbon atoms.

24. A rubber composition comprising rubber and 1-alpha-naphthylamino 2-alpha-naphthylimino ethane.

25. The method of preserving rubber which comprises treating rubber with the reaction product of a primary aromatic amine and a halogen derivative of a diethyl ether containing two halogens on different carbon atoms.

26. The method of preserving rubber which comprises treating rubber with a diaryl diamino diethyl ether.

27. The method of preserving rubber which comprises treating rubber with the reaction product of a naphthylamine and a halogen derivative of a diethyl ether containing two halogens on different carbon atoms.

28. A rubber composition comprising rubber and the reaction product of a primary aromatic amine and a halogen derivative of a diethyl ether containing two halogens on different carbon atoms.

29. A rubber composition comprising rubber and a diaryl diamino diethyl ether.

30. A rubber composition comprising rubber and the reaction product of a naphthylamine and a halogen derivative of a diethyl ether containing two halogens on different carbon atoms.

WEBSTER N. JONES.